(12) United States Patent
Fricke et al.

(10) Patent No.: US 10,100,513 B2
(45) Date of Patent: Oct. 16, 2018

(54) PROCESS FOR PRODUCING PROFILED ELEMENTS

(71) Applicant: BASF SE, Ludwigshafen (DE)

(72) Inventors: Marc Fricke, Osnabrueck (DE); Mark Elbing, Bremen (DE); Nils Mohmeyer, Osnabrueck (DE)

(73) Assignee: BASF SE, Ludwigshafen (DE)

(*) Notice: Subject to any disclaimer, the term of this patent is extended or adjusted under 35 U.S.C. 154(b) by 160 days.

(21) Appl. No.: 14/070,874

(22) Filed: Nov. 4, 2013

(65) Prior Publication Data

US 2014/0127495 A1 May 8, 2014

Related U.S. Application Data

(60) Provisional application No. 61/722,277, filed on Nov. 5, 2012.

(51) Int. Cl.
| | | |
|---|---|---|
| *E04B 1/76* | (2006.01) |
| *B29D 99/00* | (2010.01) |
| *B29C 47/04* | (2006.01) |
| *B29C 47/00* | (2006.01) |
| *B29C 47/02* | (2006.01) |

(52) U.S. Cl.
CPC ............ *E04B 1/76* (2013.01); *B29C 47/003* (2013.01); *B29C 47/02* (2013.01); *B29C 47/04* (2013.01); *B29D 99/0021* (2013.01); *Y10T 29/49826* (2015.01); *Y10T 428/24999* (2015.04); *Y10T 428/249953* (2015.04); *Y10T 428/249992* (2015.04)

(58) Field of Classification Search
None
See application file for complete search history.

(56) References Cited

U.S. PATENT DOCUMENTS

| | | | |
|---|---|---|---|
| 5,484,818 A * | 1/1996 | De Vos ............... C08G 18/022 521/123 |
| 6,399,669 B1* | 6/2002 | Suzuki .................. C08J 9/28 521/183 |
| 6,403,180 B1* | 6/2002 | Barrall ................. B32B 1/08 138/141 |
| 6,881,365 B2 | 4/2005 | Topp |
| 8,697,766 B2 | 4/2014 | Fricke et al. |
| 2002/0025427 A1* | 2/2002 | Schwertfeger et al. ...... 428/331 |
| 2005/0282922 A1* | 12/2005 | Nakamura et al. .......... 521/142 |
| 2006/0223965 A1* | 10/2006 | Trifu .................... C08G 77/54 528/35 |
| 2006/0286360 A1* | 12/2006 | Rhine .................. B01J 21/08 428/221 |
| 2007/0259979 A1* | 11/2007 | Lee .................. C08G 18/5024 521/64 |
| 2007/0289974 A1* | 12/2007 | Blair ................... F17C 13/001 220/560.15 |
| 2009/0005468 A1* | 1/2009 | Schadler .................. C08J 9/28 521/188 |
| 2009/0029109 A1* | 1/2009 | Seth ................... B32B 5/022 428/158 |
| 2010/0139195 A1 | 6/2010 | Tinianov et al. |
| 2010/0281811 A1 | 11/2010 | Knapp |
| 2011/0165407 A1* | 7/2011 | Weidinger et al. ........ 428/314.4 |
| 2011/0247215 A1* | 10/2011 | Schmidt et al. ............ 29/897.3 |
| 2011/0311802 A1* | 12/2011 | Cho et al. .................. 428/316.6 |
| 2012/0114895 A1 | 5/2012 | Vo et al. |
| 2012/0125562 A1 | 5/2012 | Mohmeyer et al. |
| 2012/0225280 A1* | 9/2012 | Schutte ................... B32B 5/18 428/319.7 |
| 2012/0232180 A1 | 9/2012 | Kunst et al. |
| 2012/0235070 A1 | 9/2012 | Fricke et al. |
| 2012/0248125 A1 | 10/2012 | Fricke et al. |
| 2012/0259030 A1 | 10/2012 | Kunst et al. |
| 2012/0276322 A1 | 11/2012 | Mohmeyer et al. |
| 2013/0052393 A1 | 2/2013 | Hahn et al. |
| 2013/0217797 A1 | 8/2013 | Fricke et al. |
| 2013/0231413 A1 | 9/2013 | Kunst et al. |
| 2014/0088215 A1 | 3/2014 | Fricke et al. |
| 2014/0206783 A1 | 7/2014 | Fricke et al. |

FOREIGN PATENT DOCUMENTS

| | | |
|---|---|---|
| CA | 2 816 739 | 5/2012 |
| CN | 201366765 Y | 12/2009 |
| CN | 101003696 A | 12/2010 |

(Continued)

OTHER PUBLICATIONS

Walder, Insulating Panel and Process for Manufacturing a Multilayer Insulating Panel, May 2, 2002, machine translation of EP1201838 A1.*
U.S. Appl. No. 14/104,135, filed Dec. 12, 2013, Cristadoro, et al.
European Search Report dated Feb. 7, 2013 in EP application 12191272 ( with English Translation of Categories of Cited Documents and written opinion).
G. Oertel et al. Polyurethane (Polyurethanes), $3^{rd}$ edition, Munich 1993, pp. 104-110.
Plastics Additives Handbook, $5^{th}$ edition, Hanser Publishers, Munich, 2001, 6 pages.
Walter Michaeli et al. "Introduction to plastics processing", $5^{th}$ edition, Sep. 2006, 95 pages.
Search Report dated Mar. 14, 2016 in Chinese Patent Application No. 201380057656.0 filed Nov. 4, 2013.

(Continued)

*Primary Examiner* — Chinessa T. Golden
(74) *Attorney, Agent, or Firm* — Oblon, McClelland, Maier & Neustadt, L.L.P.

(57) ABSTRACT

The present invention relates to composite elements comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 $N/mm^2$, determined in accordance with DIN 53421, processes for producing composite elements of this type, and the use of a composite element of this type for producing windows, doors, refrigerators, and chest freezers, or elements for facade construction.

12 Claims, No Drawings

(56) References Cited

FOREIGN PATENT DOCUMENTS

| | | |
|---|---|---|
| CN | 102304187 A | 1/2012 |
| CN | 102482446 A | 5/2012 |
| CN | 202215115 U | 5/2012 |
| DE | 1 959 464 | 6/1971 |
| DE | 28 44 006 A1 | 4/1980 |
| DE | 198 52 082 C1 | 6/2000 |
| DE | 199 61 306 A1 | 7/2001 |
| DE | 20 2009 003 392 U1 | 7/2009 |
| DE | 10 2009 037 851 A1 | 2/2011 |
| EP | 1201838 A1 * | 5/2002 |
| EP | 1 225 297 A1 | 7/2002 |
| EP | 2 062 717 A1 | 5/2009 |
| EP | 2 072 743 A2 | 6/2009 |
| GB | 1 273 706 | 5/1972 |
| KR | 10-2010-0063474 A | 6/2010 |
| KR | 10-1235970 B1 | 2/2013 |
| WO | WO 99/16996 A1 | 4/1999 |
| WO | WO 00/24799 A1 | 5/2000 |
| WO | WO 02/090703 A2 | 11/2002 |
| WO | WO 2009/027310 A1 | 3/2009 |
| WO | WO 2009/098068 | 8/2009 |
| WO | WO 2012/059388 A1 | 5/2012 |
| WO | WO 2012/066038 A2 | 5/2012 |
| WO | WO 2012/078739 A2 | 6/2012 |
| WO | WO 2012/098145 A1 | 7/2012 |
| WO | WO 2012/113759 A1 | 8/2012 |
| WO | WO 2012/119970 A2 | 9/2012 |
| WO | WO 2012/126742 A1 | 9/2012 |
| WO | WO 2012/130779 A2 | 10/2012 |
| WO | WO 2012/136608 A1 | 10/2012 |
| WO | WO 2012/146676 A1 | 11/2012 |
| WO | WO 2013/026813 A1 | 2/2013 |
| WO | WO 2013/030020 A1 | 3/2013 |
| WO | WO 2013/127647 A1 | 9/2013 |
| WO | WO 2014/048778 A1 | 4/2014 |
| WO | WO 2014/068105 A1 | 5/2014 |

OTHER PUBLICATIONS

English translation of First Office Action dated May 17, 2016 in Chinese Patent Application No. 201380057656.0 filed Nov. 4, 2013.
Korean Notice of Allowance dated Nov. 8, 2016 issued in Korean Patent Application No. 10-2014-0163184.
Second Office Action dated Jan. 24, 2017 in Chinese Patent Application No. 201380057656.0 filed Nov. 4, 2013 with English Translation.
Office Acton (Decision of Rejection) dated May 4, 2017 in Chinese Patent Application No. 201380057656.0 with English translation.

* cited by examiner

PROCESS FOR PRODUCING PROFILED ELEMENTS

The present invention relates to composite elements comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm$^2$, determined in accordance with DIN 53421, processes for producing composite elements of this type, and the use of a composite element of this type for producing windows, doors, refrigerators, and chest freezers, or elements for facade construction.

The prior art provides various approaches for optimizing the heat transfer properties of composite profiles, mostly involving integration of hollow chambers or of foam-filled hollow chambers. The production technology for this type of insulating element is therefore often complicated, since when foams are used there is the problem that either a difficult process has to be used to insert foam into a hollow chamber or only part of the entire available space in the insulating element can be utilized for the foam-fill process. Because of the increasingly stringent requirements placed upon the insulating properties of the profiles, the individual chambers are becoming ever smaller and the walls are becoming ever thinner, with resultant difficulty and expense in relation to tooling and also to extrusion technology. The insulation materials and the processing of the composite elements are subject to ever more stringent requirements in order to comply with requirements relating to thermal insulation in particular in house construction, which are also becoming increasingly stringent.

DE 28 44 006 A1 discloses by way of example a process for extruding plastics profiles with a core made of foamed plastic enclosed on all sides by a jacket made of a plastic, where a single operation is used to introduce the material for the jacket into the extruder die and simultaneously to introduce the core material into the cavity of the molded jacket, where gases introduced into the cavity of the jacket during the foaming of the core material are dissipated by way of the extruder die.

WO 99/16996 A1 discloses a process for producing frame profiles for windows or doors, where the outer profile is first produced from a thermoplastic and then a foamable mixture based on a polyurethane is introduced into the profile and, with completion of foaming of the mixture, a secure bond is produced between external profile and foam. Said document also discloses a process where the external profile is shaped first and then a prefabricated, ready-foamed core is inserted into same.

DE 199 61 306 A1 likewise discloses a process for producing a profile via extrusion. This profile comprises an external shell and a foamed internal core. In this process, the external profile shell is first extruded, and is then filled with foamable material.

DE 1 959 464 likewise discloses a process for continuously extruding continuous profiles with a jacket made of thermoplastic and with a foam core, where the jacket is first produced via extrusion from thermoplastic, and this is then filled with a foamable material.

EP 2 072 743 A2 discloses a process for filling a hollow window frame or hollow door frame with foam. For this, plastics profiles produced via extrusion are combined to give finished window frames or finished door frames, and then are filled with foam via introduction of a foamable material.

The prior art also discloses processes for producing profiles of this type which have a foamed core where ready-foamed inserts are inserted into the profiles produced via extrusion, for example in DE 202009003392 U1 or WO 02/090703 A2.

DE 10 2009 037 851 A1 discloses insulating elements for thermal isolation in profiles for window elements, for door elements, and for facade elements, a profile for window elements, for door elements, and for facade elements, and production processes therefor.

EP 2 062 717 A1 also discloses a process for producing plastics profiles with a foamed core in a coextrusion process, where a foamable material, in particular in the solid state, is coextruded into the cavity of a hollow plastics profile and is foamed therein.

However, as requirements placed upon insulation become more stringent, it is also necessary to use other insulation materials which have greater insulative effect. By way of example, in the case of windows there is no further scope for increasing the thickness of the profiles, and thermal conductivity has to be reduced without any change of thickness in order to improve insulation.

Other insulating materials used in the prior art, alongside polyurethane foams, are therefore organic aerogels or xerogels which have good property profiles for use as insulation material. By way of example, WO 2012/059388 A1 discloses aerogels and xerogels, and the use of the aerogels and xerogels as insulating material, and in vacuum insulation panels. The specification also discloses a process for producing porous materials in the form of aerogels or xerogels, where at least one polyfunctional isocyanate is reacted with an amine component which comprises at least one polyfunctional substituted aromatic amine.

The materials disclosed in that document have good insulation properties. However, the production process produces the material in the form of sheets, and it is not therefore possible to use the processes known from the prior art for incorporation in hollow chambers of profiled elements.

Starting from the prior art, it was therefore an object of the present invention to provide elements, in particular elements for window construction, which have good insulation properties and can be produced by using simple process technology.

The invention achieves said object via a composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm$^2$, determined in accordance with DIN 53421.

The composite element of the invention comprises a profile and an insulating core enclosed at least to some extent by the profile. For the purposes of the present invention, a profile here is a solid structure which has cutouts or hollow chambers which extend along the profile. In the invention the location of the insulating core is in these cutouts or hollow chambers within the composite element. Accordingly, the profile encloses the insulating core at least to some extent, and preferably completely. Accordingly, the insulating core extends along the profile.

In the invention, the insulating core is composed of an organic porous material which has a thermal conductivity in the range from 13 to 30 mW/m*K, determined in accordance with DIN 12667, and a compressive strength of more than 0.20 N/mm$^2$, determined in accordance with DIN 53421.

Suitable materials are known in principle. By way of example, organic aerogels or organic xerogels have these properties.

Accordingly, one preferred embodiment of the present invention provides a composite element comprising a profile and an insulating core enclosed at least to some extent by the profile as described above, where the organic porous material is one selected from the group consisting of organic xerogels and organic aerogels and combinations of two or more thereof.

The composite elements of the invention have surprisingly good insulation properties. Because of the low thermal conductivities of the organic porous materials used it is possible here, despite the low thicknesses prescribed by construction technology for the insulation material, to achieve good properties which meet the increasingly stringent requirements for thermal insulation.

The composite elements of the invention are particularly suitable for producing construction elements which require a low U value (heat transfer coefficient), examples being windows and doors.

The composite elements of the invention can moreover be produced easily and at low cost.

The invention further provides a continuous process for producing a composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm$^2$, determined in accordance with DIN 53421, where the profile is constructed around the insulating core.

The organic porous materials used in the invention have a thermal conductivity in the range from 13 to 30 mW/m*K, determined in accordance with DIN 12667, in particular in the range from 13.5 to 25 mW/m*K, more preferably in the range from 14 to 22 mW/m*K, particularly preferably in the range from 14.5 to 20 mW/m*K.

It is particularly preferable in the invention to use, as organic porous materials, organic aerogels with a thermal conductivity in the range from 14 to 22 mW/m*K, particularly preferably in the range from 14.5 to 20 mW/m*K.

The organic porous materials used in the invention also have a compressive strength of more than 0.20 N/mm$^2$, determined in accordance with DIN 53421, in particular of more than 0.25 N/mm$^2$, more preferably of more than 0.30 N/mm$^2$ and particularly preferably of more than 0.35 N/mm$^2$.

The high compressive strength of the materials is a measure of stiffness and permits production and storage of the materials, and this facilitates processing during the production of composite elements. The materials can moreover have structural significance.

The standard rigid foams usually used for the insulation have, by way of example for a thermal conductivity in the range from 20 to 25 mW/m*K, compressive strengths of only about 0.15 N/mm$^2$. Although the compressive strength of materials of that type could be increased by increasing the thickness, there would be a simultaneous increase in thermal conductivity and insulation properties would therefore become poorer.

For the purposes of the present invention, a xerogel is a porous material which has a porosity of at least 70% by volume and a volume-average pore diameter of at most 50 micrometers and which has been produced by a sol-gel process, where the liquid phase has been removed from the gel via drying below the critical temperature and below the critical pressure of the liquid phase ("subcritical conditions").

Correspondingly, for the purposes of the present invention an aerogel is a porous material which has a porosity of at least 70% by volume and a volume-average pore diameter of at most 50 micrometers, and which has been produced via a sol-gel process, where the liquid phase has been removed from the gel via drying above the critical temperature and above the critical pressure of the liquid phase ("supercritical conditions").

The average pore diameter is determined by means of mercury intrusion measurement in accordance with DIN 66133, and for the purposes of the present invention is in principle a volume average.

It is preferable that the volume-average pore diameter of the porous material is at most 20 micrometers. It is particularly preferable that the volume-average pore diameter of the porous material is at most 10 micrometers, and it is very particularly preferable that it is at most 5 micrometers, and in particular at most 3 micrometers.

Although from the point of view of low thermal conductivity a minimum pore size, with high porosity, is desirable, the production process prescribes a practical lower limit for the volume-average pore diameter. The volume-average pore diameter is generally at least 50 nm, preferably at least 100 nm. In many instances, the volume-average pore diameter is at least 200 nm, in particular at least 300 nm.

Accordingly, one preferred embodiment of the present invention provides a composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm$^2$, determined in accordance with DIN 53421, and is one selected from the group consisting of organic xerogels and organic aerogels and combinations of two or more thereof.

Organic xerogels and aerogels preferred for the purposes of the present invention are described below.

It is preferable that the organic aerogel or xerogel is based on isocyanates and optionally on other components that are reactive toward isocyanates. By way of example, the organic aerogels or xerogels can be based on isocyanates and on OH-functional and/or NH-functional compounds.

Preference is given in the invention by way of example to organic xerogels based on polyurethane, polyisocyanurate, or polyurea, or organic aerogels based on polyurethane, polyisocyanurate, or polyurea.

Accordingly, one preferred embodiment of the present invention provides a composite element comprising a profile and an insulating core enclosed at least to some extent by the profile, as described above, where the organic porous material is one selected from the group of organic xerogels based on polyurethane, polyisocyanurate, or polyurea, organic aerogels based on polyurethane, polyisocyanurate, or polyurea, and combinations of two or more thereof.

It is particularly preferable that the organic aerogel or xerogel is based on isocyanates and on components reactive toward isocyanates, where at least one polyfunctional aromatic amine is used as component reactive toward isocyanates. It is preferable that the organic xerogel or aerogel is based on polyurea and/or polyisocyanurate.

"Based on polyurethane" means that at least 50 mol %, preferably at least 70 mol %, in particular at least 90 mol %, of the linkages of the monomer units in the organic xerogel or aerogel take the form of urethane linkages. "Based on polyurea" means that at least 50 mol %, preferably at least 70 mol %, in particular at least 90 mol %, of the linkages of the monomer units in the organic xerogel or aerogel take the form of urea linkages. "Based on polyisocyanurate" means that at least 50 mol %, preferably at least 70 mol %, in particular at least 90 mol %, of the linkages of the monomer units in the organic xerogel or aerogel take the form of isocyanurate linkages. "Based on polyurea and/or polyisocyanurate" means that at least 50 mol %, preferably at least 70 mol %, in particular at least 90 mol %, of the linkages of the monomer units in the organic xerogel or aerogel take the form of urea linkages and/or isocyanurate linkages.

The composite elements of the invention here can also comprise combinations of various aerogels and xerogels. It is also possible for the purposes of the present invention that the composite element comprises a plurality of insulating cores. It is also possible for the purposes of the invention that the composite element comprises, alongside the organic porous material, another insulation material, for example a polyurethane.

The term organic porous material is used below to refer to the organic aerogel or xerogel used in the invention.

It is preferable that the organic porous material used is obtained in a process which comprises the following steps:
  (a) reaction of at least one polyfunctional isocyanate (a1) and of at least one polyfunctional aromatic amine (a2) in a solvent optionally in the presence of water as component (a3) and optionally in the presence of at least one catalyst (a4);
  (b) removal of the solvent to give the aerogel or xerogel.

Components (a1) to (a4) preferably used for the purposes of step (a), and the quantitative proportions, are explained below.

The term component (a1) is used below for all of the polyfunctional isocyanates (a1). Correspondingly, the term component (a2) is used below for all of the polyfunctional aromatic amines (a2). It is obvious to a person skilled in the art that the monomer components mentioned are present in reacted form in the organic porous material.

For the purposes of the present invention, the functionality of a compound means the number of reactive groups per molecule. In the case of monomer component (a1), the functionality is the number of isocyanate groups per molecule. In the case of the amino groups of monomer component (a2), the functionality is the number of reactive amino groups per molecule. A polyfunctional compound here has a functionality of at least 2.

If mixtures of compounds with different functionality are used as component (a1) or (a2), the functionality of the component is in each case obtained from the number average of the functionality of the individual compounds. A polyfunctional compound comprises at least two of the abovementioned functional groups per molecule.

Component (a1)

It is preferable to use, as component (a1), at least one polyfunctional isocyanate.

For the purposes of the process of the invention, the amount used of component (a1) is preferably at least 20% by weight, in particular at least 30% by weight, particularly preferably at least 40% by weight, very particularly preferably at least 55% by weight, in particular at least 68% by weight, based in each case on the total weight of components (a1), (a2), and, where relevant, (a3), which is 100% by weight. For the purposes of the process of the invention, the amount used of component (a1) is moreover preferably at most 99.8% by weight, in particular at most 99.3% by weight, particularly preferably at most 97.5% by weight, based in each case on the total weight of components (a1), (a2), and, where relevant, (a3), which is 100% by weight.

Polyfunctional isocyanates that can be used are aromatic, aliphatic, cycloaliphatic, and/or araliphatic isocyanates. Polyfunctional isocyanates of this type are known per se or can be produced by methods known per se. The polyfunctional isocyanates can in particular also be used in the form of mixtures, and in this case component (a1) then comprises various polyfunctional isocyanates. Polyfunctional isocyanates that can be used as monomer units (a1) have two or more than two isocyanate groups per molecule of the monomer component (where the term diisocyanates is used below for the former).

Particularly suitable compounds are diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), 3,3'-dimethyldiphenyl diisocyanate, 1,2-diphenylethane diisocyanate, and/or p-phenylene diisocyanate (PPDI), tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethyl-cyclohexane (isophorone diisocyanate, IPDI), 1,4- and/or 1,3-bis(isocyanatomethyl) cyclohexane (HXDI), cyclohexane 1,4-diisocyanate, 1-methylcyclohexane 2,4- and/or 2,6-diisocyanate, and dicyclohexylmethane 4,4'-, 2,4'-, and/or 2,2'-diisocyanate.

Aromatic isocyanates are preferred as polyfunctional isocyanates (a1). This applies in particular when water is used as component (a3).

The following are particularly preferred embodiments of polyfunctional isocyanates of component (a1):
  i) polyfunctional isocyanates based on tolylene diisocyanate (TDI), in particular 2,4-TDI or 2,6-TDI or a mixture of 2,4- and 2,6-TDI;
  ii) polyfunctional isocyanates based on diphenylmethane diisocyanate (MDI), in particular 2,2'-MDI or 2,4'-MDI or 4,4'-MDI or oligomeric MDI, which is also termed polyphenyl polymethylene isocyanate, or a mixture of two or three of the abovementioned diphenylmethane diisocyanates, or crude MDI, which arises during the production of MDI, or a mixture of at least one oligomer of MDI and of at least one of the abovementioned low-molecular-weight MDI derivatives;
  iii) a mixture of at least one aromatic isocyanate of embodiment i) and of at least one aromatic isocyanate of embodiment ii).

Oligomeric diphenylmethane diisocyanate is particularly preferred as polyfunctional isocyanate. Oligomeric diphenylmethane diisocyanate (termed oligomeric MDI below) involves a mixture of a plurality of oligomeric condensates and therefore of derivatives of diphenylmethane diisocyanate (MDI). The polyfunctional isocyanates can preferably also be composed of mixtures of monomeric aromatic diisocyanates and of oligomeric MDI.

Oligomeric MDI comprises one or more polynuclear condensates of MDI with a functionality of more than 2, in particular 3 or 4 or 5. Oligomeric MDI is known and is often termed polyphenyl polymethylene isocyanate or else polymeric MDI. Oligomeric MDI is usually composed of a mixture of MDI-based isocyanates with different functionality. Oligomeric MDI is usually used in a mixture with monomeric MDI.

The (average) functionality of an isocyanate which comprises oligomeric MDI can vary in the range from about 2.2 to about 5, in particular from 2.4 to 3.5, in particular from 2.5 to 3. This type of mixture of MDI-based polyfunctional isocyanates with different functionalities is in particular crude MDI, which is produced during the production of MDI, usually with catalysis by hydrochloric acid, in the form of intermediate product of crude MDI production.

Polyfunctional isocyanates and mixtures of a plurality of polyfunctional isocyanates based on MDI are known and are marketed by way of example by BASF Polyurethanes GmbH with trademark Lupranat®.

It is preferable that the functionality of component (a1) is at least two, in particular at least 2.2, and particularly preferably at least 2.4. The functionality of component (a1) is preferably from 2.2 to 4 and particularly preferably from 2.4 to 3.

The content of isocyanate groups of component (a1) is preferably from 5 to 10 mmol/g, in particular from 6 to 9 mmol/g, particularly preferably from 7 to 8.5 mmol/g. The person skilled in the art is aware that the content of isocyanate groups in mmol/g and the property known as equivalence weight in g/equivalent have a reciprocal relationship. The content of isocyanate groups in mmol/g is obtained from the content in % by weight in accordance with ASTM D5155-96 A.

In one preferred embodiment, component (a1) is composed of at least one polyfunctional isocyanate selected from diphenylmethane 4,4'-diisocyanate, diphenylmethane 2,4'-diisocyanate, diphenylmethane 2,2'-diisocyanate, and oligomeric diphenylmethane diisocyanate. For the purposes of this preferred embodiment, component (a1) particularly preferably comprises oligomeric diphenylmethane diisocyanate and has a functionality of at least 2.4.

The viscosity of component (a1) used can vary widely. It is preferable that component (a1) has a viscosity of from 100 to 3000 mPa·s, particularly from 200 to 2500 mPa·s.

Component (a2)

The invention uses, as component (a2), at least one polyfunctional OH-functionalized or NH-functionalized compound.

For the purposes of the process preferred in the invention, component (a2) is at least one polyfunctional aromatic amine.

Component (a2) can be to some extent produced in situ. In this type of embodiment, the reaction for the purposes of step (a) takes place in the presence of water (a3). Water reacts with the isocyanate groups to give amino groups with release of $CO_2$. Polyfunctional amines are therefore to some extent produced as intermediate product (in situ). During the course of the reaction, they are reacted with isocyanate groups to give urea linkages.

In this preferred embodiment, the reaction is carried out in the presence of water (a3) and of a polyfunctional aromatic amine as component (a2), and also optionally in the presence of a catalyst (a4).

In another embodiment, likewise preferred, the reaction of component (a1) and of a polyfunctional aromatic amine as component (a2) is optionally carried out in the presence of a catalyst (a4). No water (a3) is present here.

Polyfunctional aromatic amines are known per se to the person skilled in the art. Polyfunctional amines are amines which have, per molecule, at least two amino groups reactive toward isocyanates. Groups reactive toward isocyanates here are primary and secondary amino groups, and the reactivity of the primary amino groups here is generally markedly higher than that of the secondary amino groups.

The polyfunctional aromatic amines are preferably binuclear aromatic compounds having two primary amino groups (bifunctional aromatic amines), corresponding tri- or polynuclear aromatic compounds having more than two primary amino groups, or a mixture of the abovementioned compounds. Particularly preferred polyfunctional aromatic amines of component (a2) are isomers and derivatives of diaminodiphenylmethane.

The bifunctional binuclear aromatic amines mentioned are particularly preferably those of the general formula I,

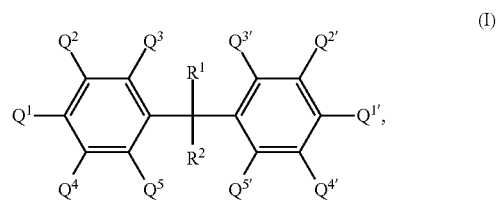

where $R^1$ and $R^2$ can be identical or different and are selected mutually independently from hydrogen and linear or branched alkyl groups having from 1 to 6 carbon atoms, and where all of the substituents $Q^1$ to $Q^5$ and $Q^{1'}$ to $Q^{5'}$ are identical or different and are selected mutually independently from hydrogen, a primary amino group, and a linear or branched alkyl group having from 1 to 12 carbon atoms, where the alkyl group can bear further functional groups, with the proviso that the compound of the general formula I comprises at least two primary amino groups, where at least one of $Q^1$, $Q^3$, and $Q^5$ is a primary amino group, and at least one of $Q^{1'}$, $Q^{3'}$, and $Q^{5'}$ is a primary amino group.

In one embodiment, the alkyl groups for the purposes of the substituents Q of the general formula I are selected from methyl, ethyl, n-propyl, isopropyl, n-butyl, sec-butyl, and tert-butyl. Compounds of this type are hereinafter termed substituted aromatic amines (a2-s). However, it is likewise preferable that all of the substituents Q are hydrogen, to the extent that they are not amino groups as defined above (the term used being unsubstituted polyfunctional aromatic amines).

It is preferable that $R^1$ and $R^2$ for the purposes of the general formula I are identical or different and are selected mutually independently from hydrogen, a primary amino group, and a linear or branched alkyl group having from 1 to 6 carbon atoms. It is preferable that $R^1$ and $R^2$ are selected from hydrogen and methyl. It is particularly preferable that $R^1=R^2=H$.

Other suitable polyfunctional aromatic amines (a2) are in particular isomers and derivatives of toluenediamine. Particularly preferred isomers and derivatives of toluenediamine for the purposes of component (a2) are toluene-2,4-diamine and/or toluene-2,6-diamine, and diethyltoluenediamines, in particular 3,5-diethyltoluene-2,4-diamine and/or 3,5-diethyltoluene-2,6-diamine.

It is very particularly preferable that component (a2) comprises at least one polyfunctional aromatic amine selected from 4,4'-diaminodiphenylmethane, 2,4'-diaminodiphenylmethane, 2,2'-diaminodiphenylmethane, and oligomeric diaminodiphenylmethane.

Oligomeric diaminodiphenylmethane comprises one or more polynuclear methylene-bridged condensates of aniline and formaldehyde. Oligomeric MDA comprises at least one, but generally a plurality of, oligomers of MDA having a functionality of more than 2, in particular 3 or 4, or 5. Oligomeric MDA is known or can be produced by methods known per se. Oligomeric MDA is usually used in the form of mixtures with monomeric MDA.

The (average) functionality of a polyfunctional amine of component (a2), where this amine comprises oligomeric MDA, can vary within the range from about 2.3 to about 5, in particular 2.3 to 3.5, and in particular from 2.3 to 3. One such mixture of MDA-based polyfunctional amines having varying functionalities is in particular crude MDA, which is produced in particular during the condensation of aniline with formaldehyde as intermediate product in production of crude MDI, usually catalyzed by hydrochloric acid.

It is particularly preferable that the at least one polyfunctional aromatic amine comprises diaminodiphenylmethane or a derivative of diaminodiphenylmethane. It is particularly preferable that the at least one polyfunctional aromatic amine comprises oligomeric diaminodiphenylmethane. It is particularly preferable that component (a2) comprises oligomeric diaminodiphenylmethane as compound (a2) and that its total functionality is at least 2.1. In particular, component (a2) comprises oligomeric diaminodiphenylmethane and its functionality is at least 2.4.

For the purposes of the present invention it is possible to control the reactivity of the primary amino groups by using substituted polyfunctional aromatic amines for the purposes of component (a2). The substituted polyfunctional aromatic amines mentioned, and stated below, hereinafter termed (a2-s), can be used alone or in a mixture with the abovementioned (unsubstituted) diaminodiphenylmethanes (where all Q in formula I are hydrogen, to the extent that they are not $NH_2$).

In this embodiment, $Q^2$, $Q^4$, $Q^{2'}$, and $Q^{4'}$ for the purposes of the formula I described above, inclusive of the attendant definitions, are preferably selected in such a way that the compound of the general formula I has at least one linear or branched alkyl group, where this can bear further functional groups, having from 1 to 12 carbon atoms in α-position with respect to at least one primary amino group bonded to the aromatic ring. It is preferable that $Q^2$, $Q^4$, $Q^{2'}$, and $Q^{4'}$ in this embodiment are selected in such a way that the substituted aromatic amine (a2-s) comprises at least two primary amino groups which respectively have one or two linear or branched alkyl groups having from 1 to 12 carbon atoms in α-position, where these can bear further functional groups. To the extent that one or more of $Q^2$, $Q^4$, $Q^{2'}$, and $Q^{4'}$ are selected in such a way that they are linear or branched alkyl groups having from 1 to 12 carbon atoms, where these bear further functional groups, preference is then given to amino groups and/or hydroxy groups, and/or halogen atoms, as these functional groups.

It is preferable that the amines (a2-s) are selected from the group consisting of 3,3',5,5'-tetraalkyl-4,4'-diaminodiphenylmethane, 3,3',5,5'-tetraalkyl-2,2'-diaminodiphenylmethane, and 3,3',5,5'-tetraalkyl-2,4'-diaminodiphenylmethane, where the alkyl groups in 3,3',5 and 5' position can be identical or different and are selected mutually independently from linear or branched alkyl groups having from 1 to 12 carbon atoms, where these can bear further functional groups. Preference is given to abovementioned alkyl groups methyl, ethyl, n-propyl, isopropyl, n-butyl, sec-butyl or tert-butyl (in each case unsubstituted).

In one embodiment, one of, a plurality of, or all of, the hydrogen atoms of one or more alkyl groups of the substituents Q can have been replaced by halogen atoms, in particular chlorine. As an alternative, one of, a plurality of, or all of, the hydrogen atoms of one or more alkyl groups of the substituents Q can have been replaced by $NH_2$ or OH. However, it is preferable that the alkyl groups for the purposes of the general formula I are composed of carbon and hydrogen.

In one particularly preferred embodiment, component (a2-s) comprises 3,3',5,5'-tetraalkyl-4,4'-diaminodiphenylmethane, where the alkyl groups can be identical or different and are selected independently from linear or branched alkyl groups having from 1 to 12 carbon atoms, where these optionally can bear functional groups. Abovementioned alkyl groups are preferably selected from unsubstituted alkyl groups, in particular methyl, ethyl, n-propyl, isopropyl, n-butyl, sec-butyl, and tert-butyl, particularly preferably from methyl and ethyl. Very particular preference is given to 3,3',5,5'-tetraethyl-4,4'-diaminodiphenylmethane, and/or 3,3',5,5'-tetramethyl-4,4'-diaminodiphenylmethane.

The abovementioned polyfunctional amines of component (a2) are known per se to the person skilled in the art or can be produced by known methods. One of the known methods is the reaction of aniline or, respectively, of derivatives of aniline with formaldehyde, with acidic catalysis.

As explained above, water, as component (a3), can to some extent replace the polyfunctional aromatic amine, in that it reacts with an amount, then calculated in advance, of additional polyfunctional aromatic isocyanate of component (a1) in situ to give a corresponding polyfunctional aromatic amine.

The term organic gel precursor (A) is used below for components (a1) to (a3).

Catalyst (a4)

In one preferred embodiment, the process of the invention is preferably carried out in the presence of at least one catalyst as component (a4).

Catalysts that can be used are in principle any of the catalysts which are known to the person skilled in the art and which accelerate the trimerization of isocyanates (these being known as trimerization catalysts) and/or accelerate the reaction of isocyanates with amino groups (these being known as gel catalysts), and/or—to the extent that water is used—accelerate the reaction of isocyanates with water (these being known as blowing catalysts).

The corresponding catalysts are known per se, and perform in different ways in respect of the abovementioned three reactions. They can thus be allocated to one or more of the abovementioned types according to performance. The person skilled in the art is moreover aware that reactions other than the abovementioned reactions can also occur.

Corresponding catalysts can be characterized inter alia on the basis of their gel to blowing ratio, as is known by way of example from Polyurethane [Polyurethanes], 3rd edition, G. Oertel, Hanser Verlag, Munich, 1993, pp. 104 to 110.

To the extent that no component (a3), i.e. no water, is used, preferred catalysts have significant activity with regard to the trimerization process. This has an advantageous effect on the homogeneity of the network structure, resulting in particularly advantageous mechanical properties.

To the extent that water is used as component (a3), preferred catalysts (a4) have a balanced gel to blowing ratio, so that the reaction of component (a1) with water is not excessively accelerated, with an adverse effect on the network structure, and simultaneously a short gelling time is obtained, and therefore the demolding time is advantageously small. Preferred catalysts simultaneously have significant activity in respect of trimerization. This has an advantageous effect on the homogeneity of the network structure, giving particularly advantageous mechanical properties.

The catalysts can be a monomer unit (incorporable catalyst) or can be non-incorporable.

It is advantageous to use the smallest effective amount of component (a4). It is preferable to use amounts of from 0.01 to 5 parts by weight, in particular from 0.1 to 3 parts by weight, particularly preferably from 0.2 to 2.5 parts by weight, of component (a4), based on a total of 100 parts by weight of components (a1), (a2), and (a3).

Catalysts preferred for the purposes of component (a4) are selected from the group consisting of primary, secondary, and tertiary amines, triazine derivatives, organometallic compounds, metal chelates, quaternary ammonium salts, ammonium hydroxides, and also the hydroxides, alkoxides, and carboxylates of alkali metals and of alkaline earth metals.

Suitable catalysts are in particular strong bases, for example quaternary ammonium hydroxides, e.g. tetraalkylammonium hydroxides having from 1 to 4 carbon atoms in the alkyl moiety and benzyltrimethylammonium hydroxide, alkali metal hydroxides, e.g. potassium hydroxide or sodium hydroxide, and alkali metal alkoxides, e.g. sodium methoxide, potassium ethoxide and sodium ethoxide, and potassium isopropoxide.

Other suitable catalysts are in particular alkali metal salts of carboxylic acids, e.g. potassium formate, sodium acetate, potassium acetate, potassium 2-ethylhexanoate, potassium adipate, and sodium benzoate, and alkali metal salts of long-chain fatty acids having from 8 to 20, in particular from 10 to 20, carbon atoms and optionally having pendant OH groups.

Other suitable catalysts are in particular N-hydroxyalkyl quaternary ammonium carboxylates, e.g. trimethylhydroxypropylammonium formate.

Examples of suitable organophosphorus compounds, in particular oxides of phospholenes, are 1-methylphospholene oxide, 3-methyl-1-phenylphospholene oxide, 1-phenylphospholene oxide, 3-methyl-1-benzylphospholene oxide.

Organometallic compounds are known per se to the person skilled in the art in particular as gel catalysts and are likewise suitable as catalysts (a4). Organotin compounds, such as tin 2-ethylhexanoate and dibutyltin dilaurate are preferred for the purposes of component (a4). Preference is further given to metal acetylacetonates, in particular zinc acetylacetonate.

Tertiary amines are known per se to the person skilled in the art as gel catalysts and as trimerization catalysts. Tertiary amines are particularly preferred as catalysts (a4). Preferred tertiary amines are in particular N,N-dimethylbenzylamine, N,N'-dimethylpiperazine, N,N-dimethylcyclohexylamine, N,N',N''-tris(dialkylaminoalkyl)-s-hexahydrotriazines, e.g. N,N',N''-tris(dimethylaminopropyl)-s-hexahydrotriazine, tris(dimethylaminomethyl)phenol, bis(2-dimethylaminoethyl)ether, N,N,N,N,N-pentamethyldiethylenetriamine, methylimidazole, dimethylimidazole, aminopropylimidazole, dimethylbenzylamine, 1,6-diazabicyclo[5.4.0]undec-7-ene, triethylamine, triethylenediamine (IUPAC: 1,4-diazabicyclo[2,2,2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine, and diisopropanolamine, methyldiethanolamine, butyldiethanolamine, and hydroxyethylaniline.

Catalysts particularly preferred for the purposes of component (a4) are selected from the group consisting of N,N-dimethylcyclohexylamine, bis(2-dimethylaminoethyl)ether, N,N,N,N,N-pentamethyldiethylenetriamine, methylimidazole, dimethylimidazole, aminopropylimidazole, dimethylbenzylamine, 1,6-diazabicyclo[5.4.0]undec-7-ene, trisdimethylaminopropylhexahydrotriazine, triethylamine, tris(dimethylaminomethyl)phenol, triethylenediamine (diazabicyclo[2,2,2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine, diisopropanolamine, methyldiethanolamine, butyldiethanolamine, hydroxyethylaniline, metal acetylacetonates, ammonium ethylhexanoates, and ethylhexanoates of metal ions.

The use of the catalysts (a4) preferred for the purposes of the present invention leads to porous materials with improved mechanical properties, in particular to improved compressive strength. Use of the catalysts (a4) moreover reduces the gelling time, i.e. accelerates the gelling reaction, without any adverse effect on other properties.

Solvent

The organic aerogels or xerogels used in the invention are produced in the presence of a solvent.

For the purposes of the present invention, the term solvent comprises liquid diluents, i.e. not only solvents in the narrower sense but also dispersion media. The mixture can in particular be a genuine solution, a colloidal solution, or a dispersion, e.g. an emulsion or suspension. It is preferable that the mixture is a genuine solution. The solvent is a compound that is liquid under the conditions of the step (a), preferably an organic solvent.

Solvent used can in principle comprise an organic compound or a mixture of a plurality of compounds, where the solvent is liquid under the temperature conditions and pressure conditions under which the mixture is provided (abbreviated to: solution conditions). The constitution of the solvent is selected in such a way that the solvent is capable of dissolving or dispersing, preferably dissolving, the organic gel precursor. For the purposes of the preferred process described above for producing the organic aerogels or xerogels, preferred solvents are those which are a solvent for the organic gel precursor (A), i.e. those which dissolve the organic gel precursor (A) completely under reaction conditions.

The initial reaction product of the reaction in the presence of the solvent is a gel, i.e. a viscoelastic chemical network swollen by the solvent. A solvent which is a good swelling agent for the network formed generally leads to a network with fine pores and with small average pore diameter, whereas a solvent which is a poor swelling agent for the resultant gel generally leads to a coarse-pored network with large average pore diameter.

The selection of the solvent therefore affects the desired pore size distribution and the desired porosity. The selection of the solvent is generally also carried out in such a way as very substantially to avoid precipitation or flocculation due to formation of a precipitated reaction product during or after step (a) of the process of the invention.

When a suitable solvent is selected, the proportion of precipitated reaction product is usually smaller than 1% by weight, based on the total weight of the mixture. The amount of precipitated product formed in a particular solvent can be determined gravimetrically, by filtering the reaction mixture through a suitable filter prior to the gel point.

Solvents that can be used are those known from the prior art to be solvents for isocyanate-based polymers. Preferred solvents here are those which are a solvent for components (a1), (a2), and, where relevant, (a3), i.e. those which substantially completely dissolve the constituents of components (a1), (a2), and, where relevant, (a3) under reaction conditions. It is preferable that the solvent is inert to component (a1), i.e. not reactive thereto.

Examples of solvents that can be used are ketones, aldehydes, alkyl alkanoates, amides, such as formamide and N-methylpyrrolidone, sulfoxides, such as dimethyl sulfoxide, aliphatic and cycloaliphatic halogenated hydrocarbons, halogenated aromatic compounds, and fluorine-containing ethers. It is also possible to use mixtures made of two or more of the abovementioned compounds.

Acetals can also be used as solvents, in particular diethoxymethane, dimethoxymethane, and 1,3-dioxolane.

Dialkyl ethers and cyclic ethers are also suitable as solvent. Preferred dialkyl ethers are in particular those having from 2 to 6 carbon atoms, in particular methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl tertbutyl ether, ethyl-n-butyl ether, ethyl isobutyl ether, and ethyl tert-butyl ether. Particularly preferred cyclic ethers are tetrahydrofuran, dioxane, and tetrahydropyran.

Other preferred solvents are alkyl alkanoates, in particular methyl formate, methyl acetate, ethyl formate, butyl acetate, and ethyl acetate. Preferred halogenated solvents are described in WO 00/24799, page 4, line 12 to page 5, line 4.

Aldehydes and/or ketones are preferred solvents. Aldehydes or ketones suitable as solvents are particularly those corresponding to the general formula $R^2$—(CO)—$R^1$, where $R^1$ and $R^2$ are hydrogen or alkyl groups having 1, 2, 3 or 4 carbon atoms. Suitable aldehydes or ketones are in particular acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehydes, acrolein, methacrolein, crotonaldehyde, furfural, acrolein dimer, methacrolein dimer, 1,2,3,6-tetrahydrobenzaldehyde, 6-methyl-3-cyclohexenaldehyde, cyanacetaldehyde, ethyl glyoxylate, benzaldehyde, acetone, diethyl ketone, methyl ethyl ketone, methyl isobutyl ketone, methyl n-butyl ketone, ethyl isopropyl ketone, 2-acetylfuran, 2-methoxy-4-methylpentan-2-one, cyclohexanone, and acetophenone. The abovementioned aldehydes and ketones can also be used in the form of mixtures. Particular preference is given, as solvents, to ketones and aldehydes having alkyl groups having up to 3 carbon atoms per substituent. Ketones of the general formula $R^1(CO)R^2$ are very particularly preferred, where $R^1$ and $R^2$ are mutually independently selected from alkyl groups having from 1 to 3 carbon atoms. In one first preferred embodiment, the ketone is acetone. In another preferred embodiment, at least one of the two substituents $R^1$ and/or $R^2$ comprises an alkyl group having at least 2 carbon atoms, in particular methyl ethyl ketone. Use of the abovementioned particularly preferred ketones in combination with the process of the invention gives porous materials with particularly small average pore diameter. Without any intention of restriction, it is believed that the pore structure of the resultant gel is particularly fine because of the relatively high affinity of the abovementioned particularly preferred ketones.

In many instances, particularly suitable solvents are obtained by using a mixture of two or more compounds which are selected from the abovementioned solvents and which are completely miscible with one another.

It is preferable that components (a1), (a2), and, where relevant, (a3) and, where relevant, (a4), and the solvent are provided in appropriate form prior to the reaction in step (a) of the process of the invention.

It is preferable that components (a1) on the one hand and (a2) and, where relevant, (a3) and, where relevant, (a4) on the other hand are provided separately, in each case in a suitable portion of the solvent. Separate provision permits ideal monitoring or control of the gelling reaction prior to and during the mixing process.

To the extent that water is used as component (a3), it is particularly preferable to provide component (a3) separately from component (a1). This avoids reaction of water with component (a1) with formation of networks in the absence of component (a2). Otherwise, the premixing of water with component (a1) leads to less advantageous properties in respect of the homogeneity of the pore structure and the thermal conductivity of the resultant materials.

The mixture(s) provided prior to conduct of step (a) can also comprise, as further constituents, conventional auxiliaries known to the person skilled in the art. Mention may be made by way of example of surfactant substances, nucleating agents, oxidation stabilizers, lubricants and demolding aids, dyes, and pigments, stabilizers, e.g. with respect to hydrolysis, light, heat, or discoloration, inorganic and/or organic fillers, reinforcing agents, and biocides.

Further details concerning the abovementioned auxiliaries and additives can be found in the technical literature, e.g. in Plastics Additives Handbook, 5th edition, H. Zweifel, ed. Hanser Publishers, Munich, 2001, pages 1 and 41-43.

In order to carry out the reaction in step (a) of the process, it is first necessary to produce a homogeneous mixture of the components provided prior to the reaction in step (a).

The components reacted for the purposes of step (a) can be provided in a conventional manner. It is preferable that a stirrer or other mixing apparatus is used for this purpose, in order to achieve good and rapid mixing. In order to avoid defects in the mixing process, the period necessary for producing the homogeneous mixture should be small in relation to the period within which the gelling reaction leads to the at least partial formation of a gel. The other mixing conditions are generally not critical, and by way of example the mixing process can be carried out at from 0 to 100° C. and at from 0.1 to 10 bar (absolute), in particular by way of example at room temperature and atmospheric pressure. Once a homogeneous mixture has been produced, the mixing apparatus is preferably switched off.

The gelling reaction involves a polyaddition reaction, in particular a polyaddition reaction of isocyanate groups and amino or hydroxy groups.

For the purposes of the present invention, a gel is a crosslinked system based on a polymer in contact with a liquid (terms used being solvogel or lyogel, or if water is used as liquid: aquagel or hydrogel). The polymer phase here forms a continuous three-dimensional network.

For the purposes of step (a) of the process, the gel is usually produced via standing, i.e. simply by allowing the container, reaction vessel, or reactor containing the mixture (termed gelling apparatus below) to stand. It is preferable that during the gelling (gel formation) process the mixture undergoes no further stirring or mixing, because this could inhibit formation of the gel. It has proven advantageous to cover the mixture during the gelling process or to seal the gelling apparatus.

The gelling process is known per se to the person skilled in the art and is described by way of example at page 21, line 19 to page 23, line 13 in WO 2009/027310.

For the purposes of the process, the solvent is removed in step (b) (drying). In principle, it is possible to carry out a drying process under supercritical conditions, preferably after replacing the solvent with $CO_2$ or other solvents suitable for the purposes of supercritical drying. This type of drying process is known per se to the person skilled in the art. The expression supercritical conditions means a temperature and pressure at which the fluid phase requiring removal is present in the supercritical state. The shrinkage of the gel product during removal of the solvent can thus be reduced. The material obtained from the supercritical drying process is termed aerogel.

However, with a view to simple conduct of the process it is preferable to dry the resultant gels by converting the liquid comprised within the gel to the gaseous state at a temperature and pressure below the critical temperature and critical pressure of the liquid comprised within the gel. The material obtained from the subcritical drying process is termed xerogel.

It is preferable that the resultant gel is dried via conversion of the solvent to the gaseous state at a temperature and pressure below the critical temperature and the critical pressure of the solvent. Accordingly, it is preferable that the drying process takes place via removal of the solvent that was present during the reaction without prior replacement with another solvent. Appropriate methods are likewise known to the person skilled in the art and are described at page 26, line 22 to page 28, line 36 in WO-2009/027310.

The process described above gives organic porous materials which have good properties for the use as insulation material.

It is preferable that an organic porous material used as insulating core in the composite elements of the invention has a density in the range from 70 to 300 kg/m$^3$, in particular in the range from 75 to 250 kg/m$^3$, more preferably in the range from 85 to 220 kg/m$^3$, particularly preferably in the range from 90 to 200 kg/m$^3$.

Accordingly, one preferred embodiment of the present invention provides a composite element comprising a profile and an insulating core at least to some extent enclosed by the profile, as described above, where the organic porous material has a density in the range from 70 to 300 kg/m$^3$.

Preferred organic porous materials moreover have a heat resistance which permits the continuous construction of the profile around the insulating core, i.e. are by way of example stable during extrusion of a profile. Preferred organic porous materials accordingly have a heat resistance above 160° C.

Accordingly, one preferred embodiment of the present invention provides a composite element comprising a profile and an insulating core at least to some extent enclosed by the profile, as described above, where the organic porous material has a heat resistance of more than 160° C.

The organic aerogels and xerogels used with preference in the invention have property profiles which firstly ensure that the composite elements provide good thermal insulation and secondly, by virtue of stability, permit easy production of the composite elements.

It is therefore in particular possible in the invention to produce the insulating core with the desired dimensions and shape and then to construct the profile around the insulating core. This avoids complicated processes in which it is necessary to produce a hollow profile into which the insulation material is then inserted.

The insulating core can generally have any desired shape that appears to the person skilled in the art to be suitable for the desired application. The cross-sectional shape of the insulating core can be round and/or polygonal. The shape of the core can moreover be uniform or nonuniform, and by way of example it can have cutouts, grooves, ridges, etc., and these profiling effects can run parallel to or else perpendicularly to the direction of production.

The dimensions of the insulating core are generally from 5 to 250 mm, preferably from 10 to 150 mm, particularly preferably from 15 to 100 mm, in particular from 20 to 80 mm, and in the case of cores of irregular shape these dimensions describe the greatest distances in any direction.

In one preferred embodiment, the composite element produced in the invention comprises precisely one insulating core made of an organic porous material. It is also possible in the invention that the composite element has two, three, or four cores made of an organic porous material. In the event that two, three or four cores are present in the composite element produced in the invention, these can have identical or different shape. It is also possible in the invention that the composite element has at least one insulating core made of an organic porous material and at least one other insulating core made of another material, for example of a polyurethane foam.

The composite element of the invention comprises a profile, where the profile in principle can be composed of any conceivable suitable material, in particular of thermoplastically processable materials, or else of aluminum.

The profile here encloses the insulating core to some extent or completely, preferably completely. In one preferred embodiment, the profile moreover comprises fillets attached to the core.

The thickness of the profile per se, or of the profile and any fillets belonging to the profile is generally from 1 to 20 mm, preferably from 2 to 15 mm, particularly preferably from 3 to 10 mm, and the profile and the fillets here can have identical or different thicknesses. In one preferred embodiment, the jacket or the fillets has/have various thicknesses at different points of the profile; these thicknesses are identical longitudinally but can vary transversely. This depends by way of example on the shape of the profile, which in turn depends on the subsequent use.

The profile of the composite element to be produced in the invention preferably comprises at least one thermoplastic material. Suitable thermoplastic materials are known per se to the person skilled in the art and by way of example are those selected from the group consisting of polyolefins, for example acrylonitrile-butadiene-styrene (ABS), polymethyl methacrylate (PMMA), polyethylene (PE), polypropylene (PP), polystyrene (PS) or polyvinyl chloride (PVC), polycondensates, such as polyamides (PA), for example PA 6 or PA 6,6, polylactate (PLA), polycarbonates (PC), polyesters, for example polyethylene terephthalate (PET), polyether ether ketone (PEEK) polyadducts, such as thermoplastic polyurethane, wood plastic composites, and mixtures thereof. In one particularly preferred embodiment, the jacket of the profile produced in the invention comprises polyvinyl chloride (PVC). Polyvinyl chloride (PVC) and its production via polymerization of vinyl chloride are known per se to the person skilled in the art.

Accordingly, one preferred embodiment of the present invention provides a composite element comprising a profile and an insulating core at least to some extent enclosed by the profile, as described above, where the profile is composed of polyvinyl chloride or of aluminum.

One particularly preferred embodiment of the present invention provides a composite element comprising a profile and an insulating core at least to some extent enclosed by the profile, as described above, where the profile is composed of polyvinyl chloride.

In one preferred embodiment, the profile comprises a thermoplastic material which has a melting point below 220° C.

For the purposes of the present invention, the composite element of the invention can be produced in various ways, for example continuously or batchwise, preference being given in the invention to continuous production.

For the purposes of the present invention, various processes are in principle possible for producing the composite elements of the invention, as long as they ensure that the insulating core can be introduced with precise fit into the profile.

It is preferable here that the profile is constructed around the insulating core. This simplifies the production process for the composite element of the invention, since the shaping of hollow structures in the profile is facilitated, because the insulating core prescribes the shape of the hollow structure.

The invention therefore also provides a continuous process for producing a composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm$^2$, determined in accordance with DIN 53421, where the profile is constructed around the insulating core.

It is therefore possible in the invention that the insulating core is produced with the desired shape and is stored, and is subsequently further processed.

The profile here can be constructed in various ways, for example by means of an extruder, particularly preferably by means of a ring extruder.

Accordingly, one preferred embodiment of the present invention provides a process for producing a composite element comprising a profile and an insulating core at least to some extent enclosed by the profile, as described above, where the profile is continuously constructed around the insulating core by means of a ring extruder.

One further embodiment of the present invention also provides a process for producing a composite element comprising a profile and an insulating core at least to some extent enclosed by the profile, as described above, where the profile is constructed from a plurality of parts around the insulating core.

By way of example, it is possible in the invention here that the profile is constructed from a plurality of preformed parts around the insulating core, but it is equally possible that a part is preformed, the insulating core is inserted, and the profile is then closed by way of example by means of an extruder.

If the profile is constructed from a plurality of preformed parts around the insulating core, the individual parts of the profile can be connected to one another in different ways, for example via adhesive bonding or via welding, or via push-fit connections ("clipping").

The profile can therefore preferably be constructed from a thermoplastically processable material, for example polyvinyl chloride.

Accordingly, one preferred embodiment of the present invention provides a process for producing a composite element comprising a profile and an insulating core at least to some extent enclosed by the profile, as described above, where the profile is composed of polyvinyl chloride.

The composite element can preferably be produced in the invention by means of a ring extruder. The process here comprises the introduction of the insulating core into an extruder with attached extrusion die for producing ring profiles, in order to encase the insulating core in a profile made of at least one thermoplastic material and thus obtain the composite element.

The insulating core here is introduced into an extruder which comprises a die which replicates the shape of the profile. The thermoplastic material intended to form the jacket is then applied in molten form onto the core within the extruder. Embodiments of this extruder used in the invention are well known to the person skilled in the art and are described by way of example in WO 2009/098068.

The process of the invention is preferably carried out at a temperature at which the thermoplastic material of the profile is molten, for example from 100 to 220° C., particularly preferably from 130 to 190° C.

The temperature at which the thermoplastic material solidifies downstream of the extruder is preferably by way of example from 25 to 180° C., preferably from 50 to 150° C.

The extrusion of thermoplastic materials is known per se to the person skilled in the art and is described by way of example in "Einführung in die Kunststoffverarbeitung" [Introduction to plastics processing], 5th edition, September 2006; pp. 87-180; Walter Michaeli; Hanser Fachbuchverlag.

If reinforcement is introduced into the profile in the invention, this reinforcement can have its final shape, for example that of a strip, when it is introduced into the extruder. In a second embodiment, the reinforcement is extruded simultaneously with the jacket of the profile within the extruder. For this, the material of the reinforcement is preferably introduced in a molten state by way of the extruder.

In one preferred embodiment, the dimensions of the reinforcement depend on the dimensions of the profile and can maximize the stability of the reinforced profile. The design of the reinforcement here is such as to reduce, or at least not increase, heat transport within the profile, for example in window frames or door frames.

It is also possible in the invention that the profile is constructed discontinuously around the insulating core, for example from a plurality of preformed parts; the individual parts of the profile can be connected to one another in different ways, for example via adhesive bonding or via welding, or via push-fit connections ("clipping").

It is also possible for the purposes of the present invention, in an alternative process, that the complete profile is first produced and the insulating core is then introduced into preformed hollow chambers. In this embodiment, the profile is not constructed around the insulating core.

In this process variant, any of the conventional methods can be used to introduce the insulating core into the profile, for example insertion using suction or insertion using pressure, preferably insertion using pressure.

An alternative embodiment of the present invention therefore also provides a process for producing a composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm$^2$, determined in accordance with DIN 53421, where pressure is used to insert the insulating core into the profile.

The composite elements of the invention have low thermal conductivity for the same insulation thickness, and this makes them suitable for the use for construction elements, for example for windows or doors.

It is thus possible to comply with U value limits (U value=heat transfer coefficient in W/m$^{2*}$K) for the individual constructed parts (wall, window) of the shell of a building, where these can provide good insulation.

The present invention therefore also provides the use of an organic porous material with a thermal conductivity in the range from 13 to 30 mW/m*K, determined in accordance with DIN 12667, and a compressive strength of more than 0.20 N/mm$^2$, determined in accordance with DIN 53421, as insulation material in profiles.

Accordingly, one preferred embodiment of the present invention provides the use of an organic porous material as insulation material in profiles, as described above, where the profiles are used for producing windows, doors, refrigerators, and chest freezers, or elements for facade construction.

One further embodiment of the present invention also provides the use of a composite element of the invention, or of a composite element obtainable by a process of the invention, for producing windows, doors, refrigerators, and chest freezers, or elements for facade construction.

The composite elements of the invention are suitable for the construction of various construction elements, for example of windows.

Another embodiment of the present invention therefore in particular also provides a window comprising a composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm², determined in accordance with DIN 53421.

Examples of embodiments of the present invention are listed below, but do not restrict the present invention. In particular, the present invention also comprises embodiments that result from the dependencies stated below, and therefore form combinations.

1. A composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm², determined in accordance with DIN 53421.
2. The composite element according to embodiment 1, where the organic porous material is one selected from the group consisting of organic xerogels and organic aerogels and combinations of two or more thereof.
3. The composite element according to embodiment 1 or 2, where the organic porous material is one selected from the group of organic xerogels based on polyurethane, polyisocyanurate, or polyurea, organic aerogels based on polyurethane, polyisocyanurate, or polyurea, and combinations of two or more thereof.
4. The composite element according to any of embodiments 1 to 3, where the organic porous material has a density in the range from 70 to 300 kg/m³.
5. The composite element according to any of embodiments 1 to 4, where the organic porous material has a heat resistance of more than 160° C.
6. The composite element according to any of embodiments 1 to 5, where the profile is composed of polyvinyl chloride or of aluminum.
7. A continuous process for producing a composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm², determined in accordance with DIN 53421, where the profile is constructed around the insulating core.
8. The process according to embodiment 7, where the profile is continuously constructed around the insulating core by means of a ring extruder.
9. The process according to embodiment 7, where the profile is constructed from a plurality of parts around the insulating core.
10. The process according to any of embodiments 7 to 9, where the profile is composed of polyvinyl chloride.
11. The use of an organic porous material with a thermal conductivity in the range from 13 to 30 mW/m*K, determined in accordance with DIN 12667, and a compressive strength of more than 0.20 N/mm², determined in accordance with DIN 53421, as insulation material in profiles.
12. The use according to embodiment 11, where the profiles are used for producing windows, doors, refrigerators, and chest freezers, or elements for facade construction.
13. The use of a composite element according to any of embodiments 1 to 6, or of a composite element obtainable by a process according to any of claims 7 to 10, for producing windows, doors, refrigerators, and chest freezers, or elements for facade construction.
14. A composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm², determined in accordance with DIN 53421, and is one selected from the group consisting of organic xerogels and organic aerogels and combinations of two or more thereof.
15. A composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm², determined in accordance with DIN 53421, and is one selected from the group of organic xerogels based on polyurethane, polyisocyanurate, or polyurea, organic aerogels based on polyurethane, polyisocyanurate, or polyurea, and combinations of two or more thereof.
16. A composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm², determined in accordance with DIN 53421, and is one selected from the group of organic xerogels based on polyurethane, polyisocyanurate, or polyurea, organic aerogels based on polyurethane, polyisocyanurate, or polyurea, and combinations of two or more thereof, where the organic porous material has a density in the range from 70 to 300 kg/m³.
17. A composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm², determined in accordance with DIN 53421, and is one selected from the group of organic xerogels based on polyurethane, polyisocyanurate, or polyurea, organic aerogels based on polyurethane, polyisocyanurate, or polyurea, and combinations of two or more thereof, where the organic porous material has a heat resistance of more than 160° C.
18. The composite element according to embodiment 17, where the profile is composed of polyvinyl chloride or of aluminum.
19. A composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm$^2$, determined in accordance with DIN 53421, and is one selected from the group of organic xerogels based on polyurethane, polyisocyanurate, or polyurea, organic aerogels based on polyurethane, polyisocyanurate, or polyurea, and combinations of two or more thereof, and where the profile is composed of polyvinyl chloride or of aluminum.
20. A continuous process for producing a composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm$^2$, determined in accordance with DIN 53421, where the profile is continuously constructed around the insulating core by means of a ring extruder.
21. A process for producing a composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm$^2$, determined in accordance with DIN 53421, where the insulating core is inserted under pressure into the profile.
22. A window comprising a composite element comprising a profile and an insulating core enclosed at least to some extent by the profile, where the insulating core is composed of an organic porous material which has a thermal conductivity in the range from 13 to 30 mW/m*K, determined in accordance with DIN 12667, and a compressive strength of more than 0.20 N/mm$^2$, determined in accordance with DIN 53421.
23. The use of a composite element according to any of embodiments 14 to 19, or of a composite element obtainable by a process according to any of embodiments 20 to 22, for producing windows, doors, refrigerators, and chest freezers, or elements for facade construction.

The examples below serve to illustrate the invention, but have absolutely no restrictive effect on the subject matter of the present invention.

EXAMPLES

Production Example: Aerogel

1. Starting Materials

The following compounds were used to produce the gels:
Component a1: oligomeric MDI (Lupranat® M200) with NCO content of 30.9 g per 100 g in accordance with ASTM D5155-96 A, a functionality in the region of three, and a viscosity of 2100 mPa·s at 25° C. in accordance with DIN 53018 ("compound M200" below).
Component a2: 3,3',5,5'-tetraethyl-4,4'-diaminodiphenylmethane ("MDEA" below)
Catalysts: butyldiethanolamine, methyldiethanolamine 2. Production Example 1

80 g of compound M200 were dissolved in 220 g of 2-butanone at 20° C. in a glass beaker, with stirring. 8 g of the compound MDEA and 8 g of butyldiethanolamine, and 1 g of water, were dissolved in 220 g of 2-butanone in a second glass beaker. The two solutions from step (a) were mixed. This gave a clear mixture of low viscosity. The mixture was allowed to stand at room temperature for 24 hours for hardening. The gel was then removed from the glass beaker and dried in an autoclave via solvent extraction using supercritical $CO_2$.

The gel monolith was removed from the glass beaker and transferred to a 25 l autoclave. >99% acetone was charged to the autoclave in such a way that acetone completely covered the monolith, and the autoclave was then sealed. This method can prevent shrinkage of the monolith due to evaporation of the organic solvent before the monolith comes into contact with supercritical $CO_2$. The monolith was dried in the $CO_2$ stream for 24 h. The pressure (in the drying system) was from 115 to 120 bar; the temperature was 40° C. Finally, the pressure within the system was reduced in a controlled manner to atmospheric pressure within a period of about 45 minutes at a temperature of 40° C. The autoclave was opened, and the dried monolith was removed.

The resultant porous material had a density of 150 g/L.

Thermal conductivity λ was determined in accordance with DIN EN 12667 by using guarded hot plate equipment from Hesto (Lambda Control A50). Thermal conductivity was 20.0 mW/m*K at 10° C.

Tensile strength was determined in accordance with DIN 53292 and was 0.87 N/mm$^2$.

Modulus of elasticity was determined in accordance with DIN 53292 and was 15.3 N/mm$^2$.

3. Production Example 2

80 g of compound M200 were dissolved in 220 g of 2-butanone at 20° C. in a glass beaker, with stirring. 8 g of the compound MDEA and 8 g of butyldiethanolamine, and 2 g of water, were dissolved in 220 g of 2-butanone in a second glass beaker. The two solutions from step (a) were mixed. This gave a clear mixture of low viscosity. The mixture was allowed to stand at room temperature for 24 hours for hardening. The gel was then removed from the glass beaker and dried in an autoclave via solvent extraction using supercritical $CO_2$.

The gel monolith was removed from the glass beaker and transferred to a 25 l autoclave. >99% acetone was charged to the autoclave in such a way that acetone completely covered the monolith, and the autoclave was then sealed. This method can prevent shrinkage of the monolith due to evaporation of the organic solvent before the monolith comes into contact with supercritical $CO_2$. The monolith was dried in the $CO_2$ stream for 24 h. The pressure (in the drying system) was from 115 to 120 bar; the temperature was 40° C. Finally, the pressure within the system was reduced in a controlled manner to atmospheric pressure within a period of about 45 minutes at a temperature of 40° C. The autoclave was opened, and the dried monolith was removed.

The resultant porous material had a density of 153 g/L.

Thermal conductivity A was determined in accordance with DIN EN 12667 by using guarded hot plate equipment from Hesto (Lambda Control A50). Thermal conductivity was 21.0 mW/m*K at 10° C.

Compressive strength was determined in accordance with DIN 53421 and was 0.64 N/mm² for 5.3% compression.

Modulus of elasticity was 31 N/mm².

4. Production Example 3

80 g of the compound M200 were dissolved in 250 g of ethyl acetate at 20° C. in a glass beaker, with stirring. 8 g of the compound MDEA and 8 g of methyldiethanolamine were dissolved in 250 g of ethyl acetate in a second glass beaker. The two solutions from step (a) were mixed. This gave a clear mixture of low viscosity. The mixture was allowed to stand at room temperature for 24 hours for hardening. The gel was then removed from the glass beaker and dried in an autoclave via solvent extraction using supercritical $CO_2$.

The gel monolith was removed from the glass beaker and transferred to a 25 l autoclave. >99% acetone was charged to the autoclave in such a way that acetone completely covered the monolith, and the autoclave was then sealed. This method can prevent shrinkage of the monolith due to evaporation of the organic solvent before the monolith comes into contact with supercritical $CO_2$. The monolith was dried in the $CO_2$ stream for 24 h. The pressure (in the drying system) was from 115 to 120 bar; the temperature was 40° C. Finally, the pressure within the system was reduced in a controlled manner to atmospheric pressure within a period of about 45 minutes at a temperature of 40° C. The autoclave was opened, and the dried monolith was removed.

The resultant porous material had a density of 110 g/L.

Thermal conductivity A was determined in accordance with DIN EN 12667 by using guarded hot plate equipment from Hesto (Lambda Control A50). Thermal conductivity was 20.0 mW/m*K at 10° C.

Compressive strength was 0.52 N/mm² for 10% compression.

The invention claimed is:

1. A composite element, comprising:
an insulating core consisting of an organic porous material; and
a profile at least to some extent enclosing the insulating core;
wherein
a thermal conductivity of the organic porous material is from 13 to 30 mW/m*K, determined in accordance with DIN 12667, and
a compressive strength of the organic porous material is more than 0.20 N/mm², determined in accordance with DIN 53421; and
the organic porous material is at least one selected from the group consisting of an organic xerogel based on a polyurethane having at least 50 mol % of the linkages of the monomer units in the form of urethane linkages, an organic xerogel based on a polyisocyanurate having at least 50 mol % of the linkages of the monomer units in the form of isocyanurate linkages, an organic xerogel based on a polyurea having at least 50 mol % of the linkages of the monomer units in the form of urea linkages, an organic aerogel based on a polyurethane having at least 50 mol % of the linkages of the monomer units in the form of urethane linkages, an organic aerogel based on a polyisocyanurate having at least 50 mol % of the linkages of the monomer units in the form of isocyanurate linkages, and an organic aerogel based on a polyurea having at least 50 mol % of the linkages of the monomer units in the form of urea linkages.

2. The composite element according to claim 1, wherein the organic porous material has a density in the range from 70 to 300 kg/m³.

3. The composite element according to claim 1, wherein the organic porous material has a heat resistance of more than 160° C.

4. The composite element according to claim 1, wherein the profile comprises polyvinyl chloride or aluminum.

5. An insulating material, consisting of:
an organic porous material having a thermal conductivity in the range from 13 to 30 mW/m*K, determined in accordance with DIN 12667, and
a compressive strength of more than 0.20 N/mm², determined in accordance with DIN 53421,
wherein the organic porous material is at least one selected from the group consisting of an organic xerogel based on a polyurethane having at least 50 mol % of the linkages of the monomer units in the form of urethane linkages, an organic xerogel based on a polyisocyanurate having at least 50 mol % of the linkages of the monomer units in the form of isocyanurate linkages, an organic xerogel based on a polyurea having at least 50 mol % of the linkages of the monomer units in the form of urea linkages, an organic aerogel based on a polyurethane having at least 50 mol % of the linkages of the monomer units in the form of urethane linkages, an organic aerogel based on a polyisocyanurate having at least 50 mol % of the linkages of the monomer units in the form of isocyanurate linkages, and an organic aerogel based on a polyurea having at least 50 mol % of the linkages of the monomer units in the form of urea linkages.

6. A profile, comprising:
said insulating material according to claim 5 as a core.

7. A window, door, refrigerator, freezer, or an element for a facade construction, comprising said profile according to claim 6.

8. A composite element, comprising:
a profile and an insulating core enclosed at least to some extent by the profile,
wherein the insulating core consists of an organic porous material which has
a thermal conductivity in the range from 13 to 30 mW/m*K, determined in accordance with DIN 12667, and
a compressive strength of from 0.2 to 0.64 N/mm², determined in accordance with DIN 53421; and
wherein the organic porous material is at least one selected from the group consisting of an organic xerogel based on a polyurethane having at least 50 mol % of the linkages of the monomer units in the form of urethane linkages, an organic xerogel based on a polyisocyanurate having at least 50 mol % of the linkages of the monomer units in the form of isocyanurate linkages, an organic xerogel based on a polyurea having at least 50 mol % of the linkages of the monomer units in the form of urea linkages, an organic aerogel based on a polyurethane having at least 50 mol % of the linkages of the monomer units in the form of urethane linkages, an organic aerogel based on a polyisocyanurate having at least 50 mol % of the linkages of the monomer units in the form of isocyanurate linkages, and an organic aerogel based on a polyurea having at least 50 mol % of the linkages of the monomer units in the form of urea linkages.

9. A continuous process for producing a composite element according to claim 1, said process comprising: constructing the profile around the insulating core.

10. The process according to claim 9, wherein the profile is continuously constructed around the insulating core by a ring extruder.

11. The process according to claim 9, wherein the profile is constructed from a plurality of parts around the insulating core.

12. The process according to claim 9, wherein the profile comprises polyvinyl chloride.

* * * * *

UNITED STATES PATENT AND TRADEMARK OFFICE
CERTIFICATE OF CORRECTION

PATENT NO. : 10,100,513 B2
APPLICATION NO. : 14/070874
DATED : October 16, 2018
INVENTOR(S) : Marc Fricke et al.

It is certified that error appears in the above-identified patent and that said Letters Patent is hereby corrected as shown below:

On the Title Page

Column 2, item (56), foreign patent documents, Line 3, delete "101003696" and insert -- 101903696 --, therefor.

On page 2, Column 2, item (56), other publications, Line 8, delete "Acton" and insert -- Action --, therefor.

In the Specification

In Column 13, Line 31, delete "cyanacetaldehyde," and insert -- cyanoacetaldehyde, --, therefor.

In Column 13, Line 31, delete "cyanacetaldehyde," and insert -- cyanoacetaldehyde, --, therefor.

Signed and Sealed this
Twenty-first Day of April, 2020

Andrei Iancu
*Director of the United States Patent and Trademark Office*